Patented Mar. 24, 1942

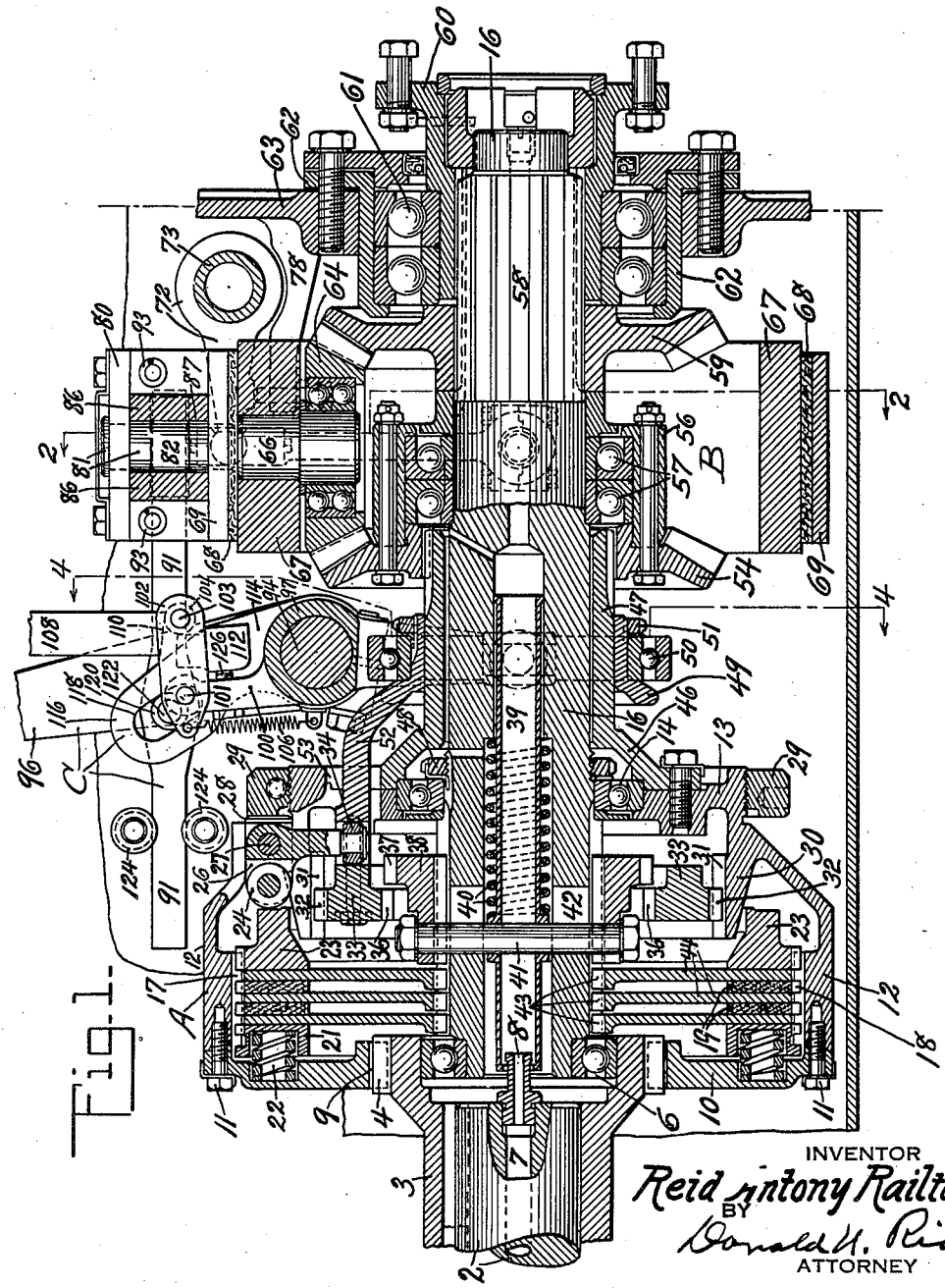

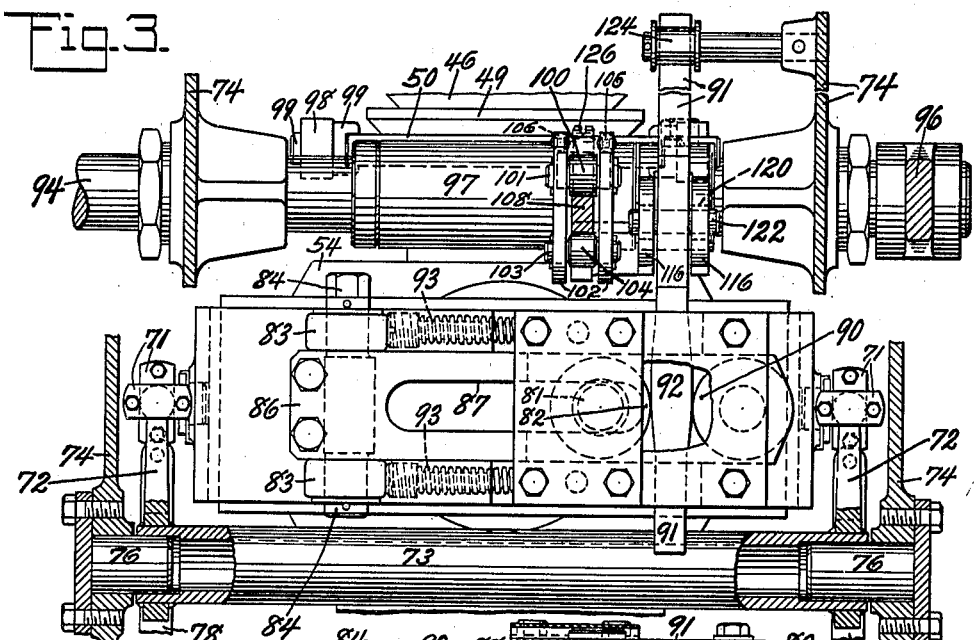
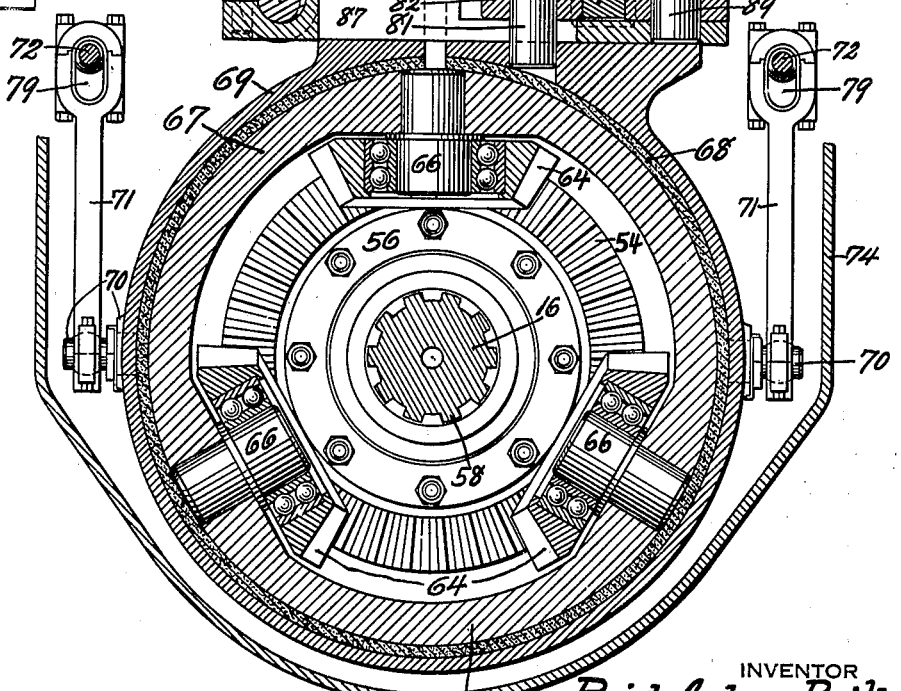

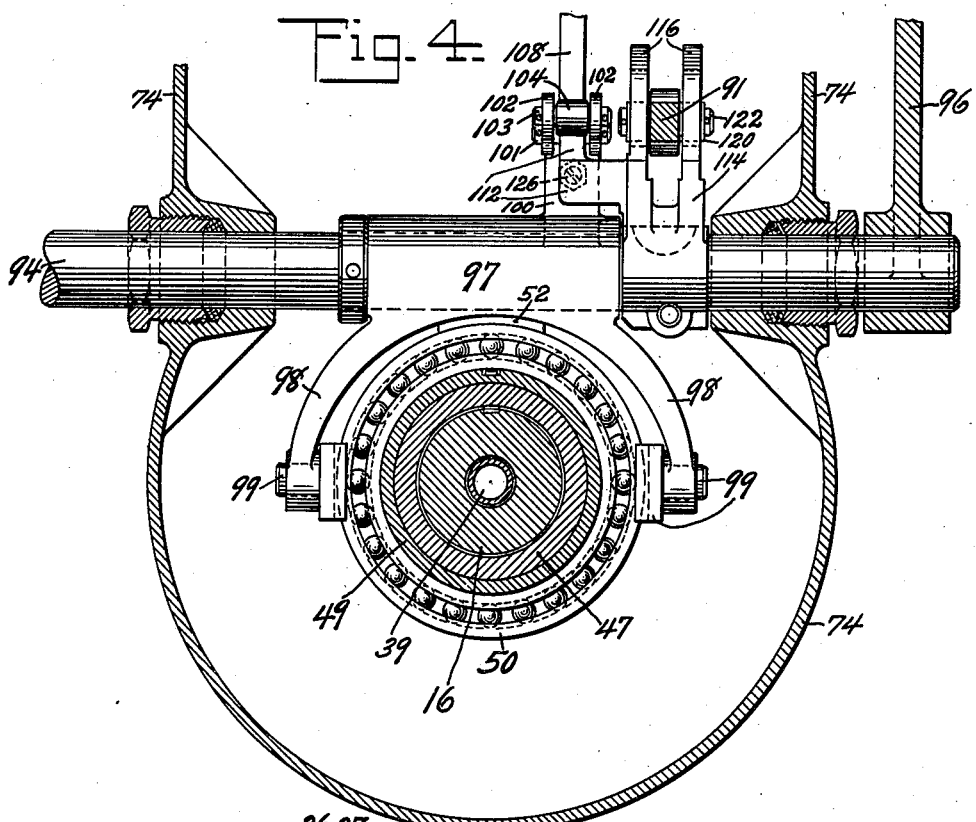
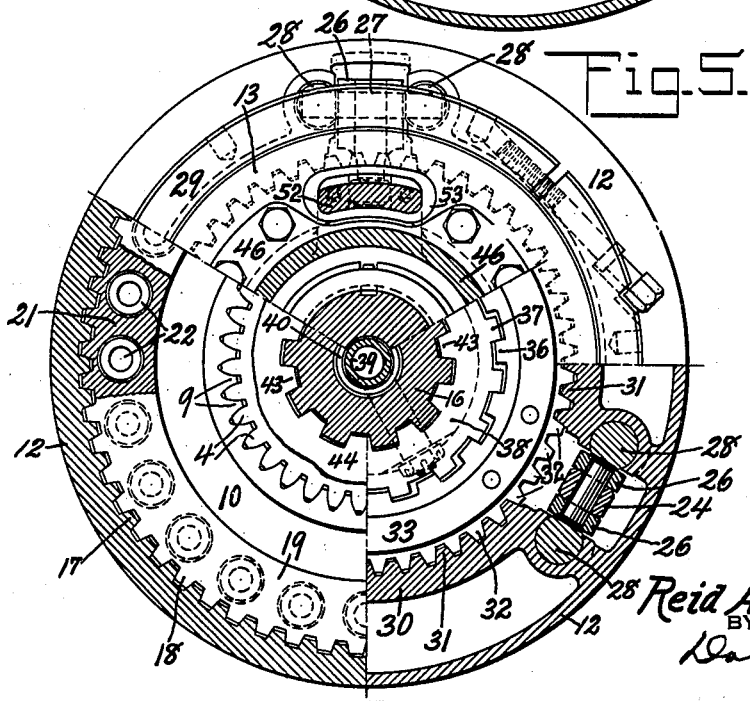

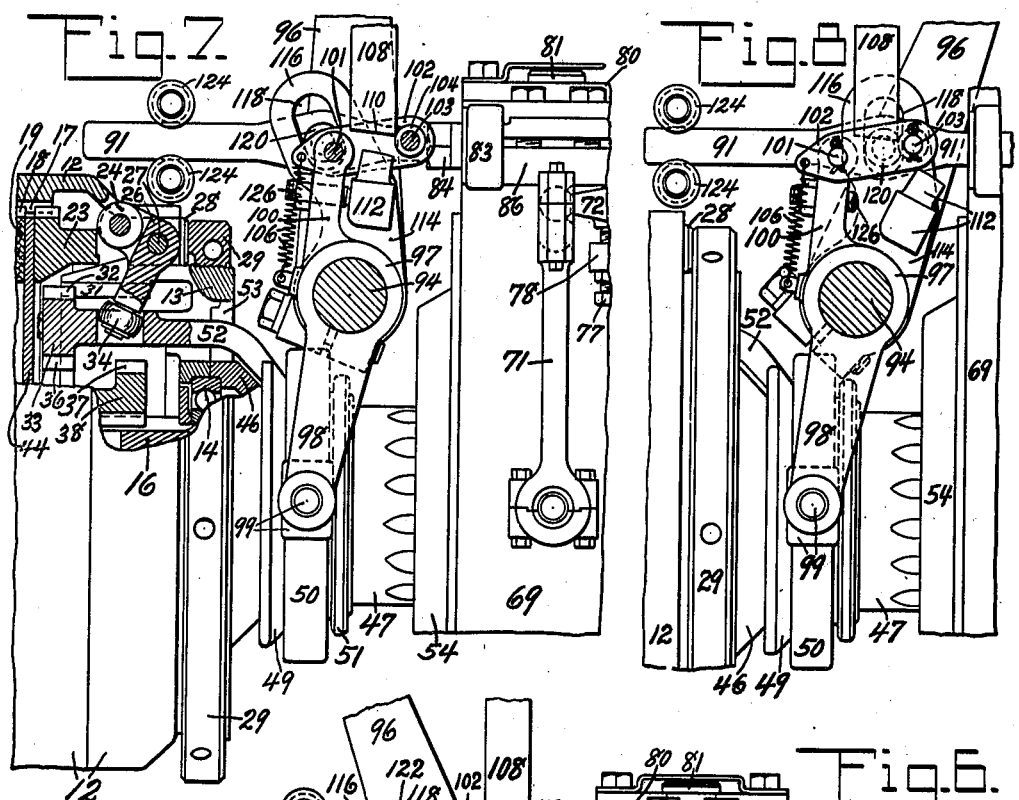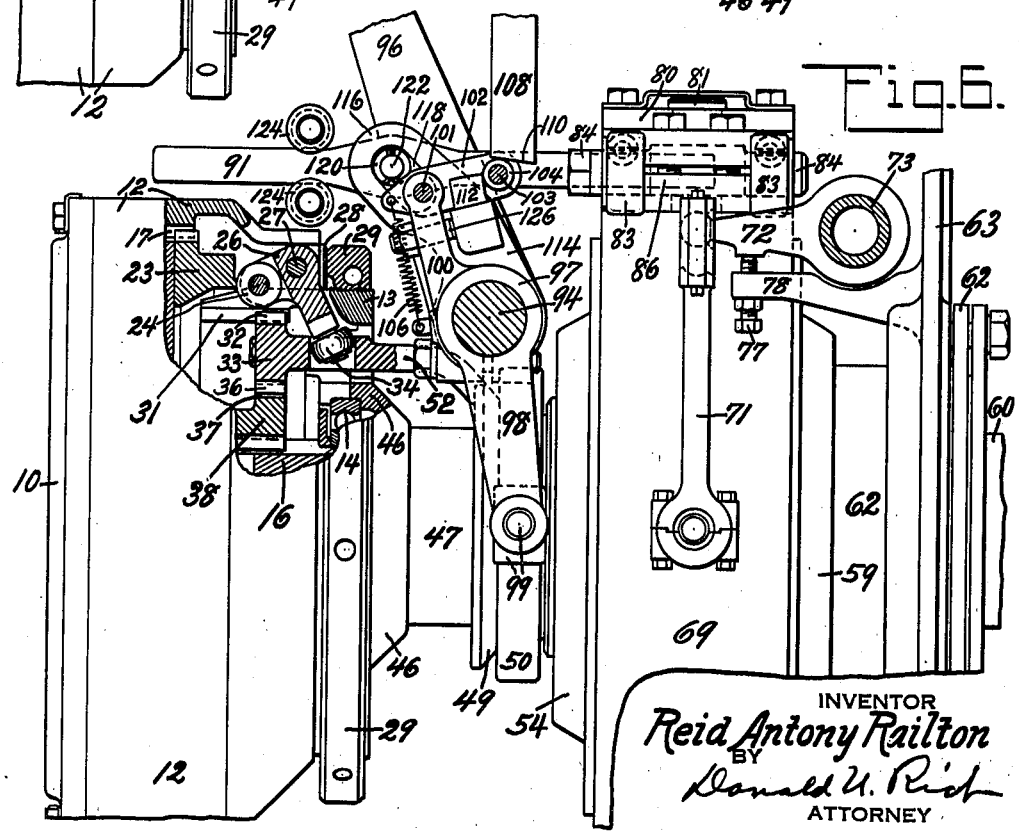

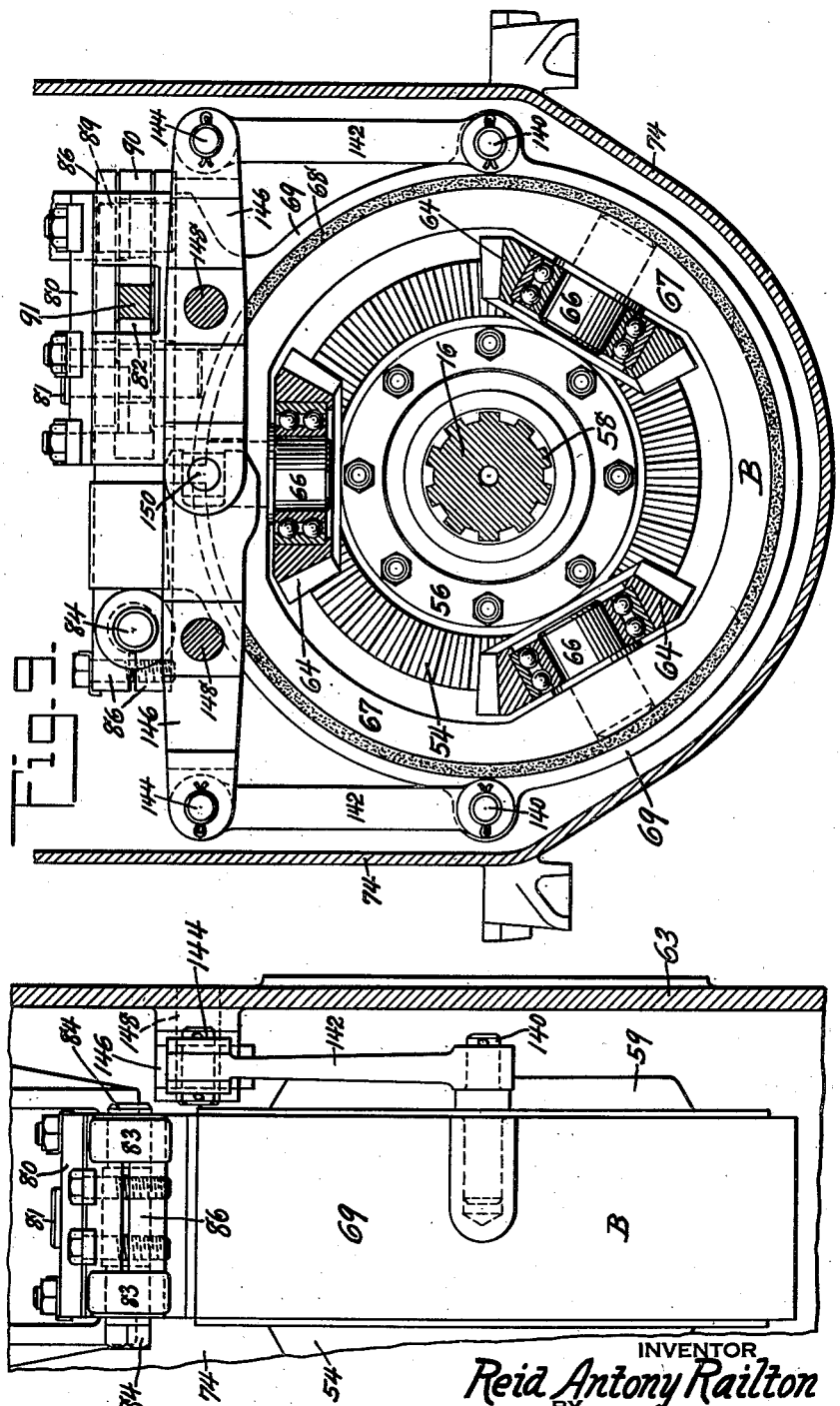

2,277,367

UNITED STATES PATENT OFFICE 2,277,367

REVERSE GEARING

Reid Antony Railton, Berkeley, Calif., assignor to Hall-Scott Motor Car Company, Berkeley, Calif., a corporation of California Application April 1, 1941, Serial No. 386,353

7 Claims. (Cl. 74—297)

This invention relates to reverse gearing in general and in particular to reverse gearing for use in high speed motor boats and has for one object thereof the provision of reverse gearing of the clutch and planetary gear type in which the clutch and gearing are unstressed in forward drive.

Another object of the invention is the provision of reverse gearing of the clutch and planetary type having a combined clutch operator and clutch lock-out.

A further object of the invention is the provision of planetary type reverse gearing having the floating or self-centering planet ring braked for reversal and in which the brake reactions cannot affect the self-centering of the planet ring.

A still further object of the invention is the provision of a planetary type reverse gearing having a floating or self-centering planet ring.

These and other objects of the invention will be apparent to persons skilled in the art from a study of the following description and accompanying drawings, in which:

Figure 1 is a longitudinal sectional view of the improved reverse gearing;

Fig. 2 is a sectional view taken substantially on line 2—2 of Figure 1 but showing the brake applied;

Figure 3 is a plan view of the improved gearing with portions of the structure broken away to better disclose the construction;

Fig. 4 is a sectional view taken substantially on line 4—4 of Figure 1;

Fig. 5 is a sectional view with parts broken away to disclose the clutch operating and lock-out mechanism;

Fig. 6 is an elevational view with parts broken away to better disclose the construction and with the parts in position for forward drive;

Fig. 7 is a side elevational view with parts broken away and showing the parts in a neutral position;

Fig. 8 is an elevational view showing the position of the operating mechanism when in reverse;

Fig. 9 is a sectional view similar to Fig. 2 but showing a modification, and

Fig. 10 is an elevational view of the modified construction shown in Fig. 9.

Referring now to the drawings in detail, it will be seen that the improved reverse gearing consists generally of three main parts, namely, a clutch part A, a reversing part B of the planetary bevel gear type and operating or control mechanism C. As clearly shown, the engine crank shaft 2 has keyed thereto a sleeve 3 terminating in a bell shaped end having gear teeth 4 formed on the periphery thereof and with the mouth providing a support for bearing 6. The crank shaft as shown is provided with an axial bore 7 for the passage of oil or other lubricant from the engine pressure system through the crank shaft and through a flow restricting nipple 8 into the reverse gearing. The gear teeth 4 of the sleeve 3 are adapted to mesh with gear teeth 9 formed in end plate 10 of the clutch portion of the gearing. This end plate is rigidly bolted as at 11 to a clutch housing 12 having an inward extension or end wall 13, whereby the inner end wall may be supported upon a bearing 14 mounted on the driven shaft 16. The clutch housing adjacent end plate 10 is provided with internal projections 17 similar to gear teeth and adapted to lock with projections 18 formed on the exterior of friction rings 19. Also locked with the projections 17 is a pressure ring plate 21 urged away from end of plate 10 by pressure springs 22 seated in the end plate and in the pressure plate. The housing projections 17 are also adapted to engage lugs formed on a clutch shaft plate 23. In order to cause movement of the clutch shaft plate a plurality of rollers 24 bear on the shaft plate and are carried by clutch shift fingers 26 rotatably mounted upon an axis 27 carried by side pieces 28 slidably mounted in the clutch housing and the position of which may be controlled by adjusting ring 29. The clutch housing is provided adjacent the inner plate 13 with a ring like portion 30 formed with internal teeth 31 adapted to always be in mesh with external teeth 32 of clutch lock-out ring 33.

The back surface of the clutch lock-out ring 33 is adapted to engage rollers 34 carried by the clutch shift fingers whereby movement of the clutch lock-out ring will cause rollers 24 to be moved thereby shifting shift plate 23 toward or away from the end plate 10. The clutch lock-out ring, which is in the form of an annulus, is provided with internal teeth 36 adapted to mesh with teeth 37 formed on a ring like lock-out gear 38 slidably splined upon the driven shaft 16. As clearly shown, the driven shaft is provided with a bore within which is slidably mounted a tube 39 constantly urged toward the engine by means of a spring 40 seated in the bore of the driven shaft. Extending transversely of the tube 39 and lock-out gear 38 is a bolt or other means 41 slidable with respect to the driven shaft, with such sliding being permitted by slots 42 formed in the driven shaft, thus the lock-out gear 38 must always rotate with the driven shaft but is axially movable along the driven shaft under action of spring 40 and is constantly urged toward the engine end of the gearing but under pressure may be shifted away from the engine by compression of the spring. The driven shaft, as clearly shown, has the engine end rotatably mounted in bearings 6 and has the splines on the inner end engageable with projections or teeth 43 formed on friction discs 44 located on either side of the friction elements 19.

The inner end wall 13 of the clutch housing has secured thereto the bell like end 46 of a sleeve member 47 rotatably mounted on the driven shaft and serving as a means for locking the clutch housing with respect to bearings 14 previously assembled on the driven shaft and adjusted to proper position by adjusting ring 48. The sleeve like portion of member 47 serves as a mount for shift collar 49 carrying bearings 50 held in position by bearing locking ring 51. The shift collar is connected by means of a projecting part 52 extending through an opening 53 in the clutch end wall 13 and with its inner end bolted or otherwise secured to the annular clutch lock-out ring 33.

One end of the sleeve like member 47 is formed with external splines adapted to engage in similar splines formed in bevel gear 54 forming a part of the gear portion B of the reverse gearing assembly. The gear 54 has bolted or otherwise secured thereto an annular ring 56 supported by bearings 57 which in turn are supported by a plain portion of the driven shaft 16, thus the clutch housing, together with its sleeve like extension, is supported upon the driven shaft by means of bearings 14 and 57, while the inner end is supported upon the engine sleeve 3 by the toothed engagement with the sleeve. As clearly shown in the drawings, the end portion of the driven shaft, remote from the engine, is formed with splines 58 adapted to engage internal splines of bevel gear 59 mounted in opposition to the bevel gear 54. The splines are also adapted to receive internal splines of a connecting sleeve 60 by means of which the assembly may be bolted or otherwise secured to the reduction or change speed gears which are not shown. The outer portion of the connecting sleeve provides a mount for bearing 61 carried by a cup 62 fastened upon the reduction gear housing or some similar support 63, thus the driven shaft is supported for rotational movement at one end by bearing 61 and at the other end by bearings 6.

Bevel gears 54 and 59 are adapted to mesh with bevel planet gears 64 rotatably carried upon stub shafts 66 firmly fixed in planet ring 67. As more clearly shown in Figs. 2 and 9, there are three of these planet gears located with their axes 120 degrees apart and converging at the axis of the driven shaft, thus the planet ring carries the planet gears, which in turn support the planet ring upon bevel gears 54 and 59. In other words, the planet ring is fully floating in that it has no bearing mount and is self-centering due to the location of the planet gears 64. In normal forward drive the planet ring, of course, rotates in unison with bevel gears 54 and 59, but in order to obtain reversal it is necessary to stop rotation of the planet ring and this is accomplished by means of friction material 68 carried by a brake band 69.

As more clearly shown in Fig. 2 the brake band has attached thereto at diametrically opposed positions projections 70 adapted to engage the lower ends of hanger links 71, the upper ends of which are supported upon the outer ends of arms 72. These arms are rigidly connected to a torque tube 73 rotatably mounted in the gear housing 74 by means of stub shafts 76, all as clearly shown in Fig. 3. As more clearly shown in Fig. 6 the position of arms 72 is positively controlled by locking set screws 77 carried by projecting bracket 78 formed on the reduction gear housing or similar fixed structure. By movement of adjusting screw 77 the position of arms 72 may be regulated, but in certain conditions such an adjustment is not sufficient, therefore, as clearly shown in Fig. 2, the engagement between suspension or hanger links 71 and arms 72 includes a reversible bearing block 79 which may be positioned either below the ends of the arms as shown or above the arms, thereby obtaining a wider range of adjustment. With this type of suspension link and torque tube arrangement the brake band may be very accurately adjusted with the freely floating or self-centering planet ring and all torque reactions transmitted from the brake band will not in any way affect the self-centering function of the planet ring, thus the gears will be relieved of unnecessary load. The wrapping tendency of the brake band will be absorbed by the suspension links, one acting in tension and the other in compression, while any axial movement of the brake band will be accommodated by the suspension links and the ball and socket connections between the links and the brake band and between the links and the supporting arms.

In order to contract the brake band, thereby applying the brake, one end of the band is provided with a housing 80 secured thereto and carrying a pin 81 upon which is journaled a roller 82, all as clearly shown in Figs. 2 and 3. The other end of the brake band is provided with an upstanding portion having ears 83 rotatably carrying an adjusting shaft 84 having an eccentric central portion engaging a pull block 86 and by means of which the position of the latter may be adjusted. The pull block is provided with one slot 87 permitting movement of the block relative to pin 81 and with long slot 88 permitting movement of the block relative to roller 82. As clearly shown in Figs. 2 and 3, the pull block extends past pin 81 and roller 82 and carries at its end pin 89 and roller 90 spaced from the roller 82 by means of a brake operating or wedge bar 91. The wedge bar, as clearly shown in Fig. 3, has a constant width rear portion and an intermediate enlarged portion 92, thus by sliding the wedge bar in and out of the space between rollers 82 and 90 the brake will be applied or released dependent upon whether wide portion 92 or the narrow portion of the wedge bar is between the rollers. Release of the brake is obtained by means of compression springs 93 bearing at their ends upon the ends of the brake band.

In order to control the operation of the clutch, lock-out ring and brake, a control mechanism C is provided. This control mechanism consists of a shaft 94 journaled in the gear housing 74 and non-rotatably carrying at one end an operating handle 96. The shaft 94 has rotatably mounted thereon intermediate the sides of the gear casing a shifter yoke 97 having spaced downwardly extending arms 98 journaled at their lower ends on trunnions 99 fixed upon the shift bearing 50 previously referred to. The shifter yoke is provided with an upstanding arm 100 carrying at its upper end a shaft or pin 101, upon the ends of which are mounted space plates 102 of a locking trigger. These space plates carry at one end a transverse shaft 103 upon which is mounted a roller 104, while the other ends are provided with openings in which tension springs 106 may be engaged, the other ends being anchored to the shifter yoke or similar convenient structure, all as clearly shown in Figs. 3, 4, 6, 7 and 8. Normally, the tension springs urge the locking trigger upwardly so that roller 104 will bear against fixed projection or cam bar 108, either upon one side or upon the tapered lower end 110. When the roller 104 is in engagement with the lower end 110 of the cam bar, the locking trigger will be forced downwardly against the tension of the spring and roller 104 will then engage a projection 112 carried upon a wedge bar shifting member 114 non-rotatably carried by shaft 94 and, therefore, movable at all times with the handle 96. The wedge bar shifting member, as clearly shown in the various figures, is formed with spaced upstanding ears 116 formed with slots 118 within which rollers 120 may operate. These rollers are carried upon the ends of a shaft 122 extending through the wedge bar 91 previously referred to. The horizontal sliding movement of the wedge bar is insured by means of spaced rollers 124 carried by the gear housing or other convenient structure. The relative location of upstanding arm 100 of the shifter yoke with respect to stop 112 is controlled by means of a locking adjusting screw 126. Thus it will be seen that in certain positions of the operating handle the locking trigger will insure movement of the shifter yoke and shift collar in unison with the handle, while in other positions of the handle the shifter yoke is released from the handle and held fixed in space by means of the locking trigger.

In the slight modification shown in Figs. 9 and 10 the bulk of the parts, insofar as gearing, gearing housing and brake portions are concerned, are identical with those previously described and accordingly the same reference numerals have been applied. In this form, however, a slight modification of the brake mounting has been made and, as clearly shown, the brake band is carried by pins 140 extending through ears on the brake band and through the lower ends of hanger or suspension links 142, the upper ends of which are mounted upon pins 144. The pins 144 are carried in the outer ends of equalizer support bars 146 pivoted at an intermediate point on pins 148 carried by the reduction gear housing and with their inner ends pivoted together by means of a slide trunnion 150; thus it will be seen that the wrapping tendency of the brake band is resisted by one hanger link acting in compression and the other in tension and with the stresses equal since the links are carried by interconnected equalizer support bars 146. In this manner the floating or self-centering planet ring is in no way affected by the application or release of the brake.

The operation of the gearing and control mechanism is as follows and assuming the parts to be in a neutral position as indicated in Fig. 7. As clearly shown in this figure, the clutch lock-out ring has been shifted to an extreme position toward the engine and clutch shift fingers have released the shift plate 23 as far as it is possible to be released, while wedge bar 91 is in a position where brake operating rollers 82 and 90 are riding on a constant width portion of the wedge bar and the brake is accordingly released. In this position also the shifter yoke and accordingly the shift collar is held in position in space due to the fact that the locking trigger has been moved upwardly bringing roller 104 in back of the cam or locking bar 108. If it is desired to drive forward the operating handle 96 is moved forward and in so moving the locking trigger is forced out of engagement with the cam or locking bar 108 and rotated downwardly into engagement with projection 112. The locking trigger will be held in this position due to roller 104 moving along the bevel lower end of the cam or locking bar. With the locking trigger in such engagement with projection 112, the shifter yoke becomes in effect a part of the operating handle and must move with the handle. Accordingly the shift collar is moved away from the engine and in so doing will bring the parts to some intermediate position such as shown in Fig. 1. In this intermediate position the brake is still released but the shifting fingers have moved causing a slight forward movement of the shift plate 23, thereby lightly gripping the friction elements 19. In this position the drive will be from the engine to the clutch housing through the friction elements 19 and friction discs 44 to the driven shaft 16 and thence through connecting sleeve 60 to the reduction gears or whatever is connected to the driven shaft. Since in this position, or a position similar to it, the friction elements are lightly engaged, slippage may occur and the rate of rotation of driven shaft 16 and consequently the application of power to the load may be readily controlled. Continued forward movement of the operating handle will in no wise affect the brake, but will increase the pressure on the clutch shift plate, while at the same time moving shifter yoke rearwardly and consequently the shift collar and connected clutch lock-out ring 33. When the operating handle has reached its extreme forward movement, the parts will be in the position shown in Fig. 6 with the clutch elements subjected to their greatest pressure and the clutch lock-out ring 33 in engagement with the lock-out gear 38. In this position the drive will be from the engine to the clutch housing through clutch housing teeth 31 to teeth 32 of the lock-out ring and thence through teeth 36 and 37 and lock-out gear 38 to the driven shaft. In this condition, which will be the condition of greatest use, the engine is directly and positively connected to the driven shaft and the clutch elements and gearing can be subjected to no stresses whatsoever. During the rearward shifting of the clutch lock-out ring it may be that teeth 36 and 37 will strike, but this does not in any way affect the operation of the handle since if the teeth do strike the lock-out gear 38 will move to the rear compressing spring 40. The first slight slippage of the clutch elements will bring the teeth 36 and 37 into proper mesh engagement and spring 40 will promptly snap lock-out gear 38 into position and the parts will be in the condition shown by Fig. 6.

Movement of the operating handle from full forward position to neutral position will, of course, reverse the operation previously described and bring the parts to the position shown in Fig. 7 in which the clutch lock-out ring 33, shift collar 49 and shifter yoke 97 have moved as far forward as it is possible for them to move. Further rearward movement of the operating handle would accordingly be impossible if the shifter yoke and attached parts were not released from connection with the operating handle. This release is automatically taken care of by the compression springs 106 of the locking trigger snapping roller 104 upwardly out of engagement with projection 112 and into engagement with the side of cam bar 108. With the locking trigger in this position the shifter yoke and all connected parts will be held by the lock-out trigger. Continued rearward movement of the operating handle will accordingly not change the position of the shifter yoke or any of its connected parts, but will through ears 116, rollers 120 and shaft 122 cause a rearward movement of the wedge bar. Rearward movement of the wedge bar will bring the widest portion 92 of the wedge bar into position between the brake operating rollers 82 and 90, thus applying the brake and slowing down the planet ring 67. When the operating handle has assumed its full rearward position the parts will be in the condition shown in Figs. 3 and 8. With the brake applied the wrapping action will be absorbed by the suspension links either 71 or 142, depending upon the type of suspension used, and without placing a strain on the floating or self-centering planet ring. Slowing down and final stoppage of the planet ring 67 will cause the gradual reversal of the direction of rotation of the driven shaft. In reverse operation the drive will be from the engine through the clutch housing to gear 54 and from gear 54 through planet gears 64 to gear 59 splined on the driven shaft. Movement of the operating handle forwardly from a reversed position will gradually release the brake and thereby gradually stop the flow of power from the engine to the driven shaft.

Although the invention has been described more or less in detail, it will be obvious that various modifications and rearrangements of parts, other than those shown and described, will suggest themselves to persons skilled in the art and all such modifications and rearrangements of parts are contemplated as will fall within the scope of the appended claims defining my invention.

What is claimed is:

1. In a reverse gearing the combination of, a drive member, a driven member, planetary gearing connecting said members and including a self-centering planet ring, and at least three equally spaced planet gears serving as the sole supporting and positioning means for the planet ring, and brake means for arresting rotation of said planet ring thereby causing reversal of the driven member, said brake means including suspension linkage having ball and socket connections to the brake band whereby the brake reactions are absorbed without affecting the position of the planet ring.

2. In a reverse gearing of the clutch and planetary gear type the combination of, a rotatable drive member, a rotatable driven member, a clutch for frictionally connecting said members for forward drive, a clutch lock-out positively connecting said members together for full forward drive after said members are rotating at substantially equal speeds, means connecting a part of said clutch and clutch lock-out for joint movement, planetary gearing also connecting said members together, brake means applicable to a part of the planetary gearing to arrest motion thereof and thereby cause reversal of the driven member, and operating means connected to said clutch lock-out and brake means and insuring separate operation of the same.

3. In a reverse gearing of the clutch and planetary gear type the combination of, a rotatable drive member, a rotatable driven member, a clutch for frictionally connecting said members for forward drive, a clutch lock-out positively connecting said members together for full forward drive after said members are rotating at substantially equal speeds, means connecting a part of said clutch and clutch lock-out for joint movement, a planetary gearing also connecting said members together, brake means applicable to a part of the planetary gearing to arrest motion thereof, and thereby cause reversal of the driven member, and operating means connected to said clutch lock-out and brake means and insuring separate operation of the same, said operating means being connected at all times to said brake means but being free of direct connection with said clutch lock-out during approximately half the permissible movement of said operating means.

4. In a reverse gearing of the clutch and planetary gear type the combination of, a rotatable drive member, a rotatable driven member, a clutch for frictionally connecting said members for forward drive, a clutch lock-out positively connecting said members together for full forward drive after said members are rotating at substantially equal speeds, means connecting a part of said clutch and clutch lock-out for joint movement, planetary gearing also connecting said members together, brake means applicable to a part of the planetary gearing to arrest motion thereof and thereby cause reversal of the driven member, a shifter yoke connected to said clutch lock-out to operate the same and the clutch operating means movable between forward and reverse positions and connected to the brake means by a wedge bar, and latch means connecting said shifter yoke to said operating means when the latter is moved toward forward position and disconnecting the yoke from the operating means when the latter is moved toward reverse position.

5. In a reverse gearing of the clutch and planetary gear type the combination of, a rotatable drive member, a rotatable driven member, a clutch for frictionally connecting said members for forward drive, a clutch lock-out positively connecting said members together for full forward drive after said members are rotating at substantially equal speeds, means connecting a part of said clutch and clutch lock-out for joint movement, planetary gearing also connecting said members together, brake means applicable to a part of the planetary gearing to arrest motion thereof and thereby cause reversal of the driven member, a shifter yoke connected to said clutch lock-out to operate the same and the clutch operating means movable between forward and reverse positions and connected to the brake means by a wedge bar, and latch means connecting said shifter yoke to said operating means when the latter is moved toward forward position and disconnecting the yoke from the operating means when the latter is moved toward reverse position, said latch means engaging a fixed stop to retain said shifter yoke in position when the latter is disconnected from the operating means.

6. In a control mechanism for reverse gearing having a clutch for forward drive and a braked planetary gearing for reverse drive the combination of, a shift yoke connected to said clutch to operate the same, a brake operating bar connected to the brake, an operating handle movable from a reverse drive position through neutral to a forward drive position, means connecting said brake operating bar and operating handle, and a latch device connecting said means and said shift yoke at all times when said operating handle is moved from neutral toward forward position but disconnecting said shift yoke and means when said handle is moved from neutral toward reverse position.

7. A brake support structure for reverse gearing having a clutch for forward drive and planetary gearing for reverse drive, a brake band for gripping a portion of the planetary gearing to stop the same, a pair of links connected to the brake band at diametrically opposed points, a pair of link supports each pivotally connected to a link, and a torque tube rigidly connected to the link supports whereby said link supports act in unison to absorb the brake reaction from the brake band.

REID ANTONY RAILTON.